July 10, 1934.  O. R. BRANDENBURG  1,966,374
DENTAL WAX SPATULA
Filed Nov. 25, 1933
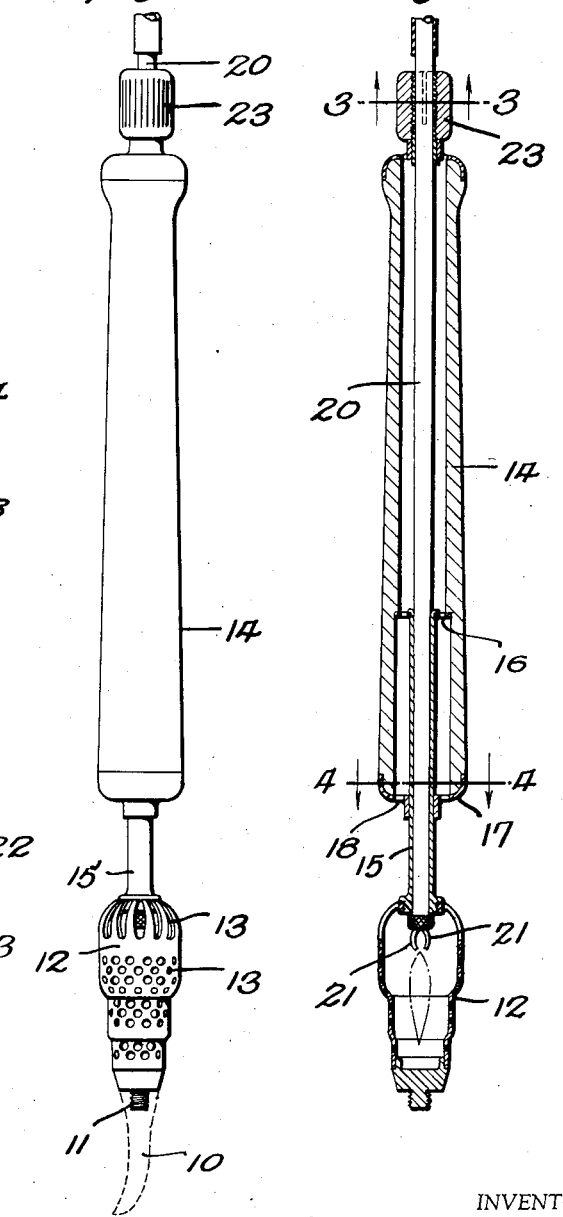
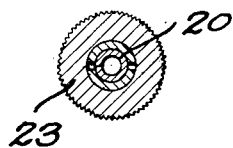
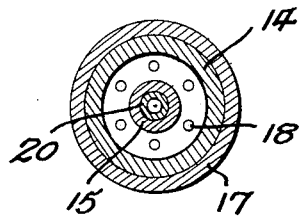
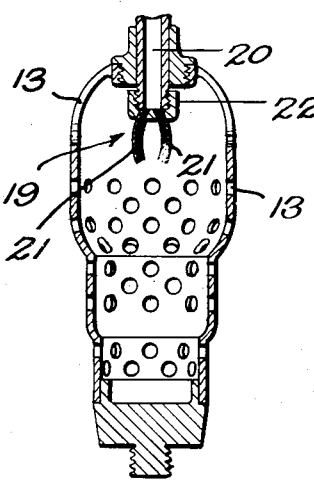
INVENTOR.
Oscar R. Brandenburg
BY
ATTORNEY.

Patented July 10, 1934

1,966,374

UNITED STATES PATENT OFFICE 1,966,374

DENTAL WAX SPATULA

Oscar R. Brandenburg, Milwaukee, Wis.

Application November 25, 1933, Serial No. 699,650

7 Claims. (Cl. 32—70)

This invention relates generally to wax spatulas employed by dentists and dental technicians and has particular reference to dental technicians and mechanical dentistry and embodies a new type of heated spatula tip.

An object of the present invention is to provide a dental spatula which can be constantly maintained at a temperature sufficient to melt and work dental wax.

A further object of the invention is to eliminate the time wasted in mechanical dentistry in stopping to reheat the spatula.

Another object of the invention is to provide an instrument which may be employed in the usual manner in which wax spatulas are used, and so that it is light in weight, compact, and safe for employment so that it may be easily and efficiently applied.

According to the invention in its general aspect as ordinarily embodied in practice, a dental wax spatula blade is affixed to one end of a heating chamber, and a heating element is mounted in the chamber and adapted to transmit heat to the spatula to keep it constantly at a sufficiently high temperature to work the dental wax.

The invention is exemplified by the dental spatula shown in the accompanying drawing, in which:

Figure 1 is an elevational view of a gas-heated wax spatula constructed in accordance with my invention.

Figure 2 is a longitudinal sectional view of the spatula.

Figure 3 is a transverse section taken on the line 3—3 of Figure 2.

Figure 4 is a transverse section of the spatula handle taken on the line 4—4 of Figure 2 showing cylindrical air-cooling chambers.

Figure 5 is a cross-section view of the heating chamber of the spatula.

The dental spatula blade 10 may be made in any desired shape suitable for molding wax in mechanical dentistry and is provided with a shank 11 with a threaded socket therein for attachment to one end of a heating chamber 12.

The heating chamber is tubular in shape and may taper toward the tip and has a plurality of apertures 13 therein of various shapes and sizes to admit air to the chamber.

The chamber 12 conserves the heat and prevents flames from directly touching the wax.

The apertures 13 adjacent the spatula blade tend to dissipate excessive heat while those toward the handle provide an entrance for air to promote combustion and provide air in sufficient quantities to produce a blue flame, while preventing such drafts as might extinguish the flame.

The chamber 12 is connected with a handle 14 by means of a tube 15 which is detachably connected to the heating chamber.

The handle is tubular and is supported from the tube by a pair of discs 16 and 17. The disc 16 is flat and circular and has a tight fit within the tubular handle and is connected to the tube 15 at the center of the disc. The disc 17 is slightly cup-shaped and supports the bottom of the handle with the tube 15 passing through and fixed to the center of the disc.

The discs 16 and 17 have a plurality of holes 18 punched therein as shown in Fig. 4 to ventilate the handle and prevent heating thereof.

Fuel is conveyed to a heating element or burner 19 in the heating chamber through a tube 20 running through the handle longitudinally.

In a gas burning instrument such as is shown in the drawing the burner 19 is composed of one or more fine jets 21 fixed in a cap 22.

The cap 22 is screw threaded on the end of the fuel tube 20 so that the burner units may be changed at will to correspond with the type of spatula blade used and with the amount of heat required.

The jets 21 are made of such inside diameter that the gas has an opportunity to mix with sufficient air after leaving the jet to produce a clear blue flame.

The heat transmitted to the blade 10 may be varied by either varying the amount of fuel supplied to the burner or by varying the position of the flame within the heating chamber 12.

To vary the position of the flame in the chamber, the tube 20 is made slidable within the handle, and fixed in adjusted position by means of a clutch 23 attached to the top of the handle.

To operate the spatula, gas is turned on through sliding tube 20, and ignited in heating chamber 12, thus directing heat to the metal spatula point 10. Operator may then move sliding tube 20 to desired position for heating spatula point, and may move flame nearer or further away from the spatula point as desired, thus securing the desired heat, and the sliding tube 20 can be held in desired position by tightening screw clutch 23 at the end of handle 14. In addition to regulating the flame as to distance from the spatula point, the heat may be intensified in a gas burner by providing interchangeable jet caps having two, three or more jets. The removable spatula point also provides for affixing other shapes and sizes of spatula points as used in dental spatulating.

The invention is susceptible to various changes and modifications and it is not therefore desired to limit the invention to the precise showing in this application, but only by the scope of the appended claims.

What is claimed as new and desired to secure by Letters Patent is:

1. A dental spatula for use in molding wax in mechanical dentistry comprising a handle, a gas tube therein having a jet, a housing forming a gas chamber, perforated to admit air, and having one end communicating with said gas tube, and a spatula point supported by the free end of said housing, the chamber of said housing being relatively large compared with said jet and of sufficient size to confine the flame and act as a shield.

2. A dental spatula for use in molding wax in mechanical dentistry comprising a handle, a gas tube adjustably mounted therein, said gas tube having a jet, a housing forming a gas chamber, perforated to admit air, and having one end communicating with said gas tube, and a spatula point supported by the free end of said housing said gas tube being movable to and from said spatula point whereby heat delivered to said point may be controlled, and the chamber of said housing being relatively large compared with said jet, and of sufficient size to confine the flame and act as a shield.

3. A dental spatula for use in molding wax in mechanical dentistry comprising a handle having a longitudinal aperture therethrough, a gas tube mounted in said aperture and spaced from the sides thereof to form a ventilating passage through the handle and around the tube, said tube terminating in a jet, a housing forming a gas chamber perforated to admit air and having one end communicating with said jet, and a spatula point supported by the free end of said housing, the chamber of said housing being relatively large compared with said jet and of sufficient size to confine the flame and act as a shield.

4. A dental spatula for use in molding wax in mechanical dentistry comprising a handle having a longitudinal aperture therethrough, a supporting tube mounted in said aperture in spaced relation thereto so as to afford free passage of air through said handle, a gas conducting tube mounted in said supporting tube and having a jet thereon, a housing forming a gas chamber and perforated to admit air thereto and having one end communicating with said jet and a spatula blade mounted on the free end of said housing.

5. A dental spatula for use in molding wax in mechanical dentistry comprising a handle having a longitudinal aperture therethrough, a supporting tube mounted in said aperture in spaced relation thereto and affording a free passage of air through said handle, a gas conducting tube adjustably mounted in said supporting tube and having a jet at one end thereof, a housing carried by said supporting tube and forming a gas chamber perforated to admit air and having one end communicating with said gas tube, a spatula point supported by the free end of said housing, said gas tube being movable within the handle to and from said spatula point whereby heat delivered to said point may be controlled.

6. A dental spatula for use in molding wax in mechanical dentistry comprising a handle, a gas tube therein having a plurality of jets, a housing forming a gas chamber, perforated to admit air, and having one end communicating with said gas tube, and a spatula point supported by the free end of said housing, the chamber of said housing being relatively large compared with said jets and of sufficient size to confine the flame and act as a shield.

7. A dental spatula for use in molding wax in mechanical dentistry comprising a handle, a gas tube adjustably mounted therein said gas tube having a plurality of jets, a housing forming a gas chamber, perforated to admit air and having one end communicating with said gas tube, and a spatula point supported by the free end of said housing said gas tube being movable to and from said spatula point whereby heat delivered to said point may be controlled, and the chamber of said housing being relatively large compared with said jets, and of sufficient size to confine the flame and act as a shield.

OSCAR R. BRANDENBURG.